US012085170B2

(12) United States Patent
Larson et al.

(10) Patent No.: US 12,085,170 B2
(45) Date of Patent: Sep. 10, 2024

(54) GASKET INCLUDING ELASTOMERIC JOINTS (71) Applicant: Federal-Mogul Motorparts LLC, Southfield, MI (US)

(72) Inventors: Richard Michael Larson, Des Moines, IL (US); Bartosz Gagor, North Lake, IL (US)

(73) Assignee: Federal-Mogul Motorparts LLC, Northville, MI (US)

( * ) Notice: Subject to any disclaimer, the term of this patent is extended or adjusted under 35 U.S.C. 154(b) by 22 days.

(21) Appl. No.: 17/730,520

(22) Filed: Apr. 27, 2022

(65) Prior Publication Data
US 2023/0349466 A1    Nov. 2, 2023

(51) Int. Cl.
*F16J 15/08*    (2006.01)

(52) U.S. Cl.
CPC .... *F16J 15/0818* (2013.01); *F16J 2015/0856* (2013.01)

(58) Field of Classification Search
CPC ........................ F16J 15/0818; F16J 2015/0856
See application file for complete search history.

(56) References Cited

U.S. PATENT DOCUMENTS

| | | | | |
|---|---|---|---|---|
| 2,826,807 A * | 3/1958 | Harris | ................... | F16B 21/088 269/93 |
| 3,175,832 A * | 3/1965 | Carrell | ................... | F16L 23/22 277/632 |
| 3,231,289 A * | 1/1966 | Carrell | ................... | F16J 15/108 277/632 |
| 3,724,599 A * | 4/1973 | Heidacker | ............. | F02F 7/0046 184/106 |
| 3,738,670 A * | 6/1973 | Jelinek | ................... | F16J 15/121 49/482.1 |
| 4,068,646 A * | 1/1978 | Hnojsky | ............ | F01M 11/0004 180/69.1 |
| 4,265,495 A * | 5/1981 | Backlin | ..................... | F16C 9/02 384/429 |
| 4,784,396 A * | 11/1988 | Scott | ..................... | F16B 41/002 411/111 |
| 5,092,291 A | 3/1992 | Langlois | | |
| 5,222,745 A * | 6/1993 | Akbar | ................... | F02F 11/007 277/944 |
| 5,236,203 A * | 8/1993 | Uchida | ............. | F01M 11/0004 277/631 |
| 5,618,047 A * | 4/1997 | Belter | .................... | F16J 15/067 277/650 |
| 5,960,763 A | 10/1999 | Yamamura | | |

(Continued)

FOREIGN PATENT DOCUMENTS

| | | |
|---|---|---|
| FR | 2659122 B1 | 10/1993 |
| JP | 2011038532 A | 2/2011 |
| JP | 2012122589 A * | 6/2012 |

*Primary Examiner* — Vishal A Patel
(74) *Attorney, Agent, or Firm* — Federal-Mogul Motorparts LLC (57) ABSTRACT A gasket for an internal-combustion engine is designed to seal between an engine block and a cover of the internal-combustion engine. The gasket includes a plurality of members that are metal and a layer of elastomeric material on the members. The elastomeric layer includes joints between the members. The joints allow the gasket to flex to accommodate potential variation in sealing surface of the engine block without bending of the members.

20 Claims, 8 Drawing Sheets (56) References Cited

U.S. PATENT DOCUMENTS

| | | | |
|---|---|---|---|
| 6,419,239 B1 * | 7/2002 | Ueda | F16J 15/14 |
| | | | 277/639 |
| 6,530,575 B2 * | 3/2003 | Poquet | F02F 7/006 |
| | | | 277/592 |
| 6,553,664 B1 | 4/2003 | Schenk | |
| 6,626,439 B1 * | 9/2003 | Forry | F16J 15/123 |
| | | | 277/592 |
| 10,103,364 B2 * | 10/2018 | Horimoto | H01M 8/0273 |
| 2007/0154769 A1 | 7/2007 | Kuroki et al. | |
| 2020/0408303 A1 | 12/2020 | Gruhler et al. | |
| 2021/0071618 A1 | 3/2021 | Salzmann et al. | |
| 2022/0333688 A1 * | 10/2022 | Gruhler | F16J 15/0818 |

* cited by examiner

GASKET INCLUDING ELASTOMERIC JOINTS

BACKGROUND

An internal combustion engine includes an engine block and one or more covers fixed to the engine block. For example, the internal combustion engine includes a cover, e.g., an oil pan. The cover is sealed to the engine block to prevent fluid flow between flanges of the cover and the oil pan. Some engine blocks and covers are designed to be sealed with a liquid sealant that hardens after assembly of the cover to the engine block. As an example, the liquid sealant may be silicone such as room-temperature-vulcanized (RTV) silicone.

The engine block and the cover both include sealing surfaces that are sealed together with the liquid sealant. The sealing surface of the engine block may include different segments that are in different planes as it can be made up of different components (back, front, cover). In such examples, the liquid sealant flows across the gap between the different planes to seal the sealing surface of the cover to the sealing surface of the engine block.

In examples in which the cover is sealed to the engine block with a liquid sealant, the liquid sealant is applied during the initial assembly of the internal combustion engine. This application may be performed, for example, robotically to ensure proper placement and amount of the liquid sealant. During service to the internal combustion engine that requires removal of the cover, the seal between the cover and the engine block is destroyed. The previously applied liquid sealant is removed. New liquid sealant, in liquid form, may be applied between the cover and the engine block to seal the cover to the engine block.

DETAILED DESCRIPTION

With reference to the Figures, wherein like numerals indicate like parts throughout the several views, a gasket 10 for an internal-combustion engine 12 is designed to seal between an engine block 14 and a cover 16 of the internal-combustion engine 12. The gasket 10 includes a plurality of members 18, 20, 22, 24 that are metal and a layer of elastomeric material (hereinafter referred to as "elastomeric layer 26") on the members 18, 20, 22, 24. The elastomeric layer 26 includes joints 28, 30, 32, 34 between the members 18, 20, 22, 24.

Figure 5:
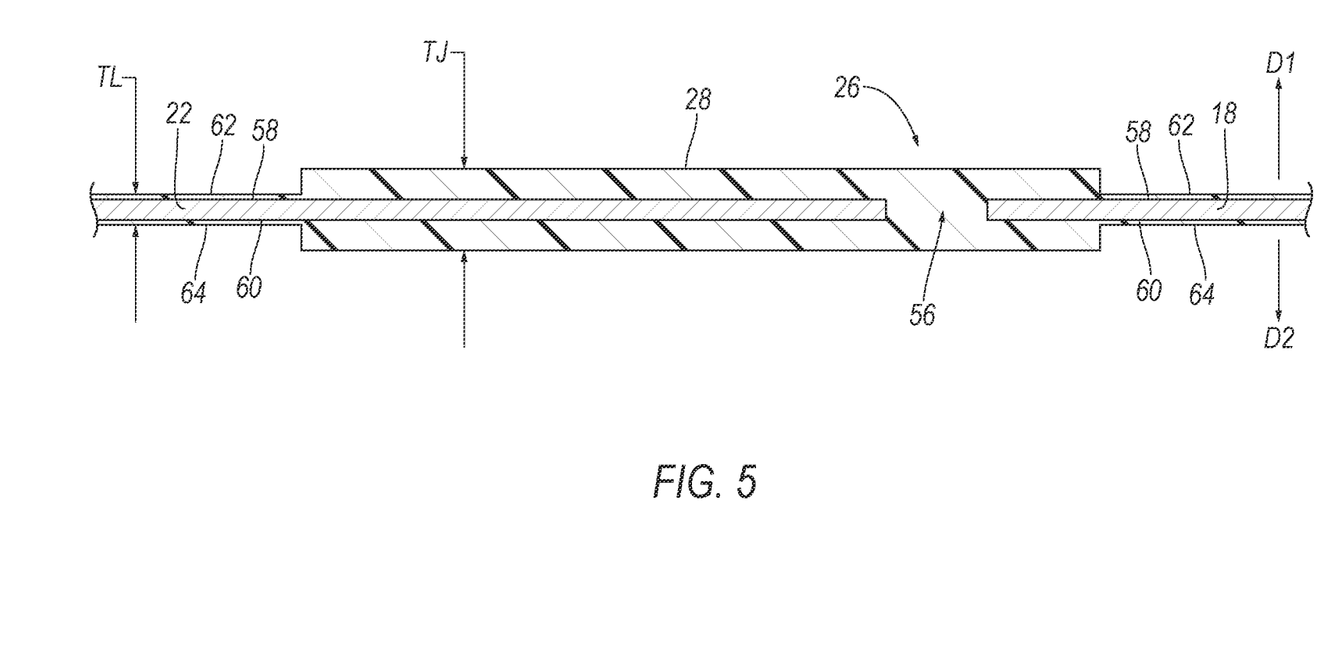
FIG. 5 is a cross section of FIG. 4.
Figure 8:
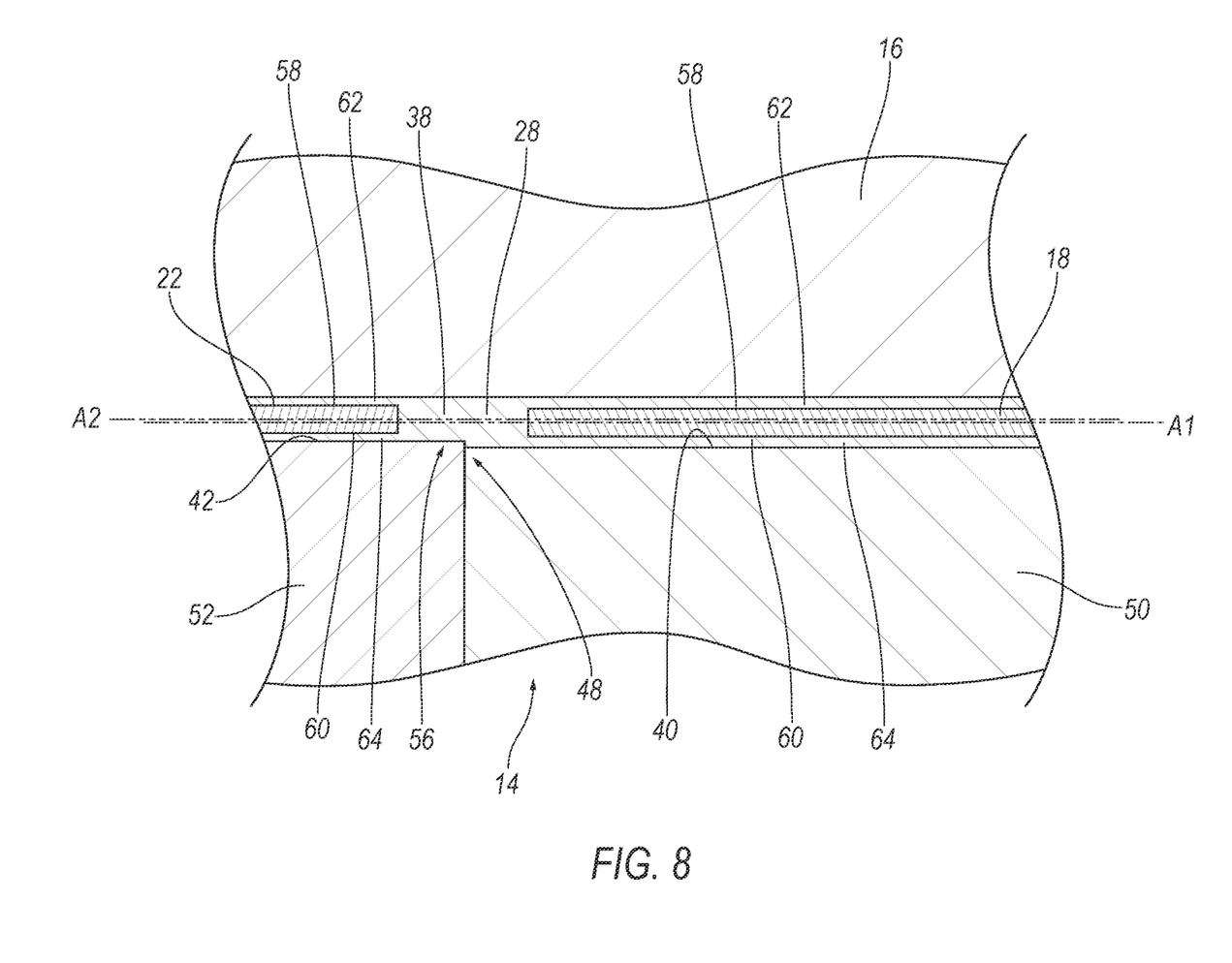
FIG. 8 is a cross section of a portion of the engine block, the cover, and the gasket.

The joints 28, 30, 32, 34 of the elastomeric layer 26 that are between the members 18, 20, 22, 24 allows the members 18, 20, 22, 24 to move relative to each other to conform to the shape of sealing surfaces 36, 38 of the engine block 14 and cover 16, e.g., to changes in plane of either of the sealing surfaces 36, 3836, 38. Specifically, the sealing surface 36 of the engine block 14 may have multiple segments in different planes. For example, the sealing surface 36 of the engine block 14 may include a first segment 40 and a second segment 42 in a different plane than the first segment 40. In such examples, the sealing surface includes a gap 48 between the different segments, e.g., a gap 48 between first segment 40 and the second segment 42 as shown in FIGS. 5 and 8. In such an example, the joints 28, 30, 32, 34 are aligned with the gaps 48 and, since joints 28, 30, 32, 34 allow the metal members 18, 20, 22, 24 to move relative to each other, the joints 28, 30, 32, 34 allow the gasket 10 to conform to the sealing surface 36 of the engine block 14. In other words, the gasket 10 flexes across the gap 48.

Specifically, the gasket 10 includes at least three members, namely a first member 18, a second member 20, and a third member 22 between the first member 18 and the second member 20. In the example shown in the figures, the gasket 10 also includes a fourth member 24. The elastomeric layer 26 includes at least two joints, namely a first joint 28 between the first member 18 and third member 22 and a second joint 30 between the second member 20 and the third member 22. The first joint 28 and the second joint 30 allow the third member 22 to move to a different plane than the first segment 40 and the second segment 42. For example, the third member 22 may abut the first segment 40 of the sealing surface 36 of the engine block 14 and the first member 18 and/or second member 20 may abut the second segment 42 of the sealing surface 36 of the engine block 14 in examples in which the first segment 40 and the second segment 42 are in different planes. In such an example, the first member 18 and the second member 20 may both be elongated in a first plane P1 and the third member 22 between the first member 18 and the second member 20 may be in a second plane P2 spaced from the first plane P1.

Figure 6:
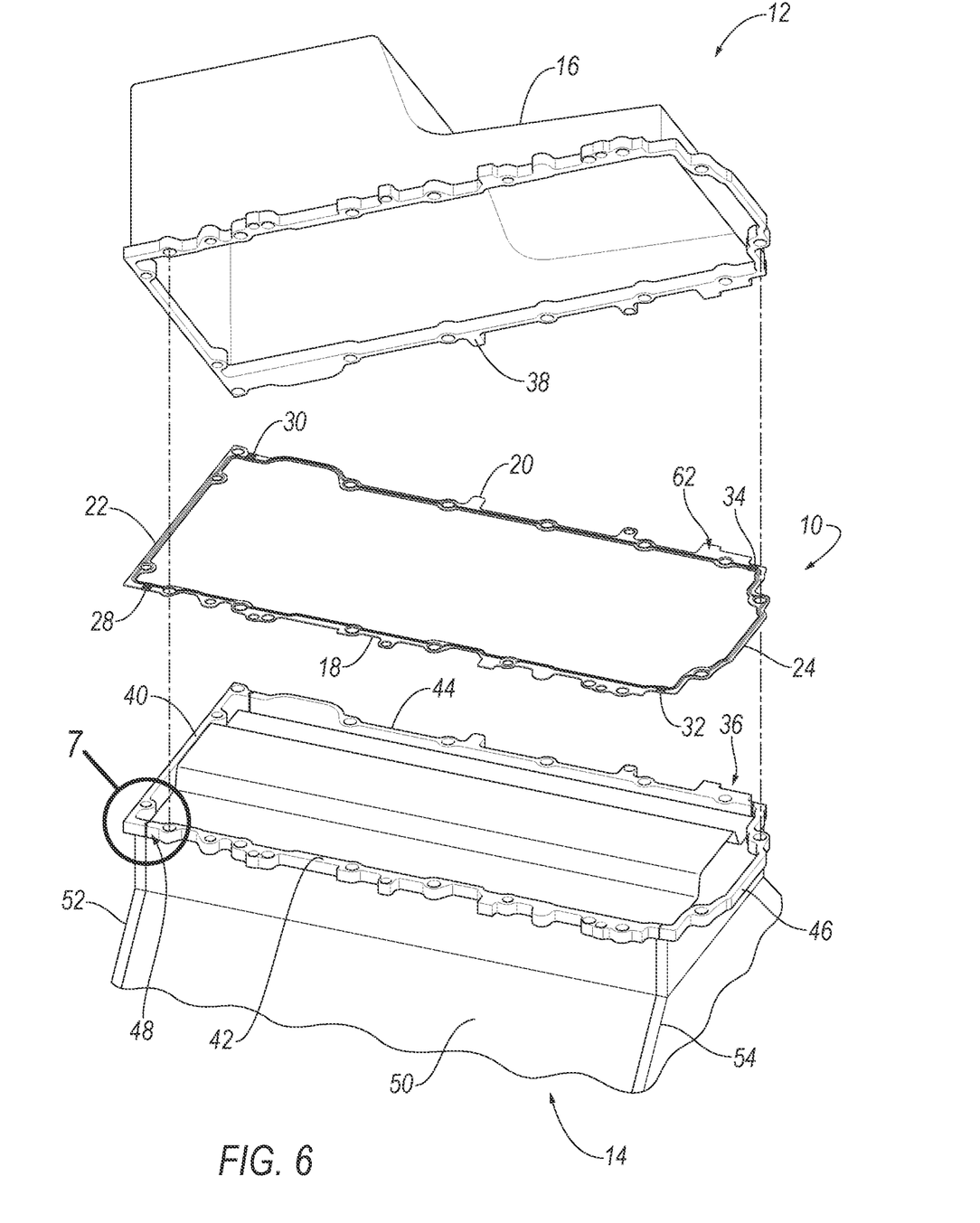
FIG. 6 is an exploded view from the bottom of an engine block, a cover, and the gasket therebetween.

Various views of the gasket 10 are shown in FIGS. 1-5. FIG. 6 shows the gasket 10, the engine block 14, and the cover 16. With reference to FIG. 6, the internal-combustion engine 12 may be used for, as an example, an automobile. The engine block 14 supports other components of the internal-combustion engine 12 such as pistons, valves, lubricating and cooling fluids, etc. The engine block 14 may be any suitable material, e.g., aluminum, steel, etc.

The engine block 14 may include a base 50 and at least one cover plate connected to the base 50. In the example shown in FIG. 6, the engine block 14 includes two cover plates connected to the base 50, namely a first cover plate 52 and a second cover plate 54. The cover plates 52, 54 may be sealed to the base 50 to retain fluids in the engine block 14. The cover plates may be removably connected to the base 50, e.g., with threaded fasteners. The first cover plate 52 abuts the base 50 and the second cover plate 54 abuts the base 50. Specifically, the first cover plate 52 abuts the base 50 at the sealing surface 36 of the engine block 14 and the second cover plate 54 abuts the base 50 at the sealing surface 36 of the engine block 14. As set forth below, the first cover plate 52 and/or the second cover plate 54 may be offset from the base 50 at the sealing surface during assembly so that the sealing surface is in different planes.

The cover 16 is releasably engageable with the engine block 14, e.g., by use of the fasteners (fastener holes in the cover 16, the gasket 10, and the engine block 14 shown in FIG. 6). The cover 16 may be, for example, an oil pan. As other examples, the cover 16 may be a valve cover (also referred to as a rocker cover), a cylinder head cover, etc. The cover 16 may be of any suitable material, e.g., aluminum, steel, plastic, etc.

With continued reference to FIG. 6, as set forth above, the engine block 14 and the cover 16 have sealing surfaces 36, 38. The gasket 10 seals the sealing surface 36 of the engine block 14 to the sealing surface 38 of the cover 16, as described further below.

Figure 7:
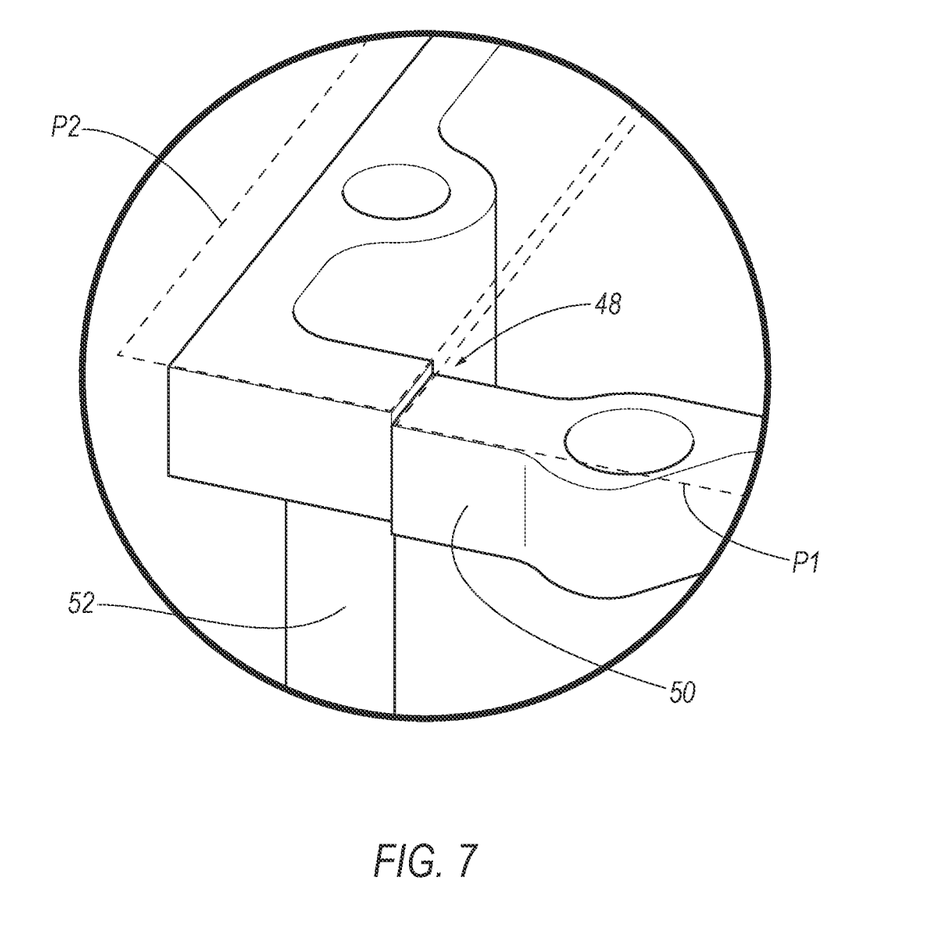
FIG. 7 is a magnified view of a portion of FIG. 6.

The sealing surface 36 of the engine block 14 may include different segments 40, 42, 44, 46 in different planes. In the example shown in FIG. 6, the sealing surface 36 of the engine block 14 includes four segments 40, 42, 44, 46, namely a first segment 40, a second segment 42, a third segment 44, and a fourth segment 46. Specifically, the base 50 of the engine block 14 presents the second segment 42 and the third segment 44, the first cover plate 52 presents the first segment 40, and the second cover plate 54 presents the fourth segment 46. The first cover plate 52 abuts the base 50 at the sealing surface 36 and the second cover plate 54 abuts the base 50 at the sealing surface 36. One or more of the segments 40, 42, 44, 46 may be in different planes. In the example shown in FIG. 6, the first segment 40 is in a different plane than the second segment 42 and the third segment 44, and the fourth segment 46 is in a different plane than the second segment 42 and the third segment 44. The first segment 40 and the fourth segment 46 may be in different planes. The first segment 40 and the fourth segment 46 being in different planes than the second segment 42 and the third segment 44 may be a result of alignment, or lack thereof, of the first cover plate 52 and the second cover plate 54 on the base 50. Specifically, manufacturing and assembly tolerances and/or stack-up may result in the misalignment of the segments 40, 42, 44, 46 of the sealing surface 36. The different planes of the first segment 40 and the second segment 42 are shown in FIGS. 7 and 8 as an example and similarly other adjacent segments 40, 42, 44, 46 may be in different planes. When adjacent segments 40, 42, 44, 46 are in different planes, a gap 48 in the sealing surface exists between the segments 40, 42, 44, 46, as identified in FIG. 7.

The sealing surface 38 of the cover 16 may be planar. In other words, the entire sealing surface 38 of the cover 16 may be in a single plane, as shown in the example in FIG. 6. The size and shape of the sealing surface 38 of the cover 16 matches the size and shape of the sealing surface 36 of the engine block 14 such that the sealing surfaces 36, 38 mate with the gasket 10 therebetween sealing the sealing surfaces 36, 38 together. The gasket 10 is sized and shaped to mate with the sealing surface 38 of the cover 16 and the engine block 14 to seal the cover 16 to the engine block 14.

Figure 1:
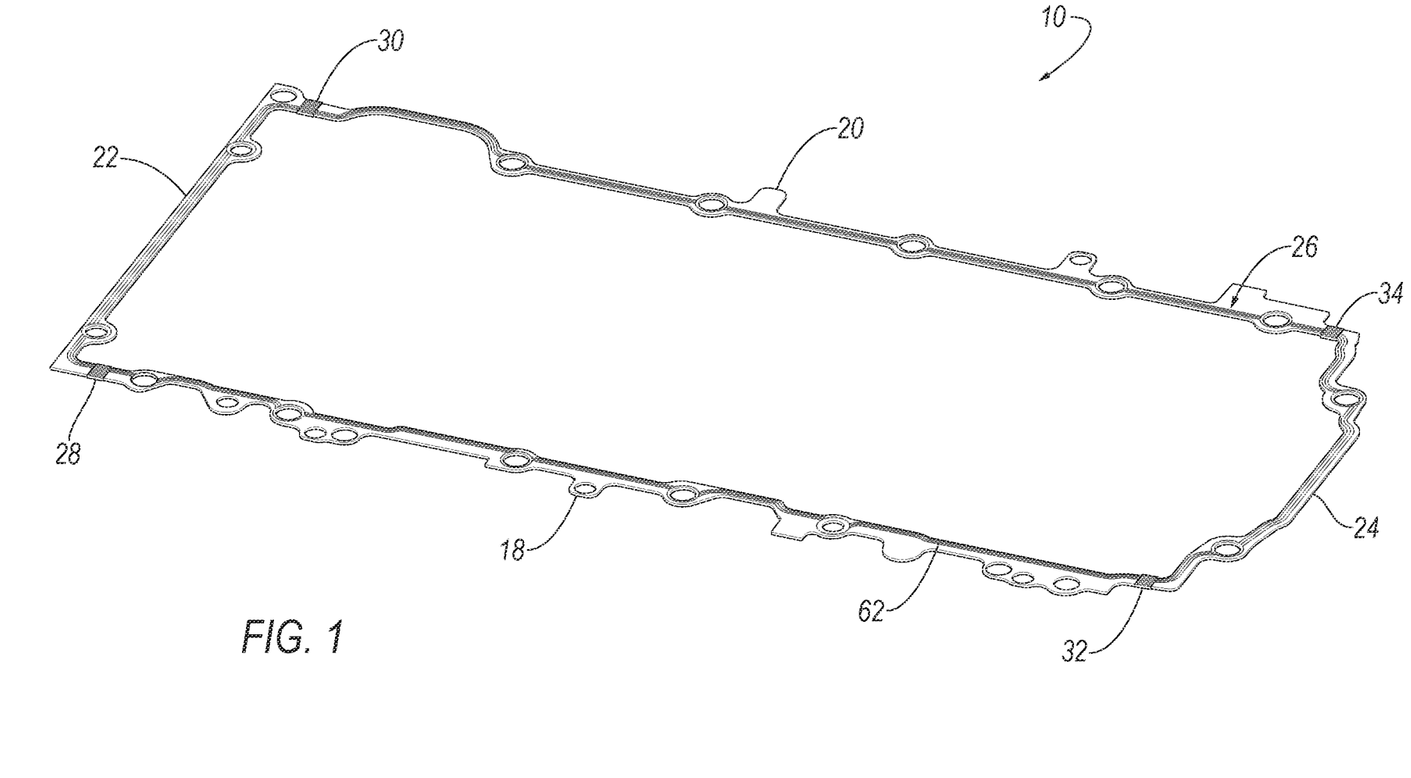
FIG. 1 is a perspective view of a gasket.
Figure 2:
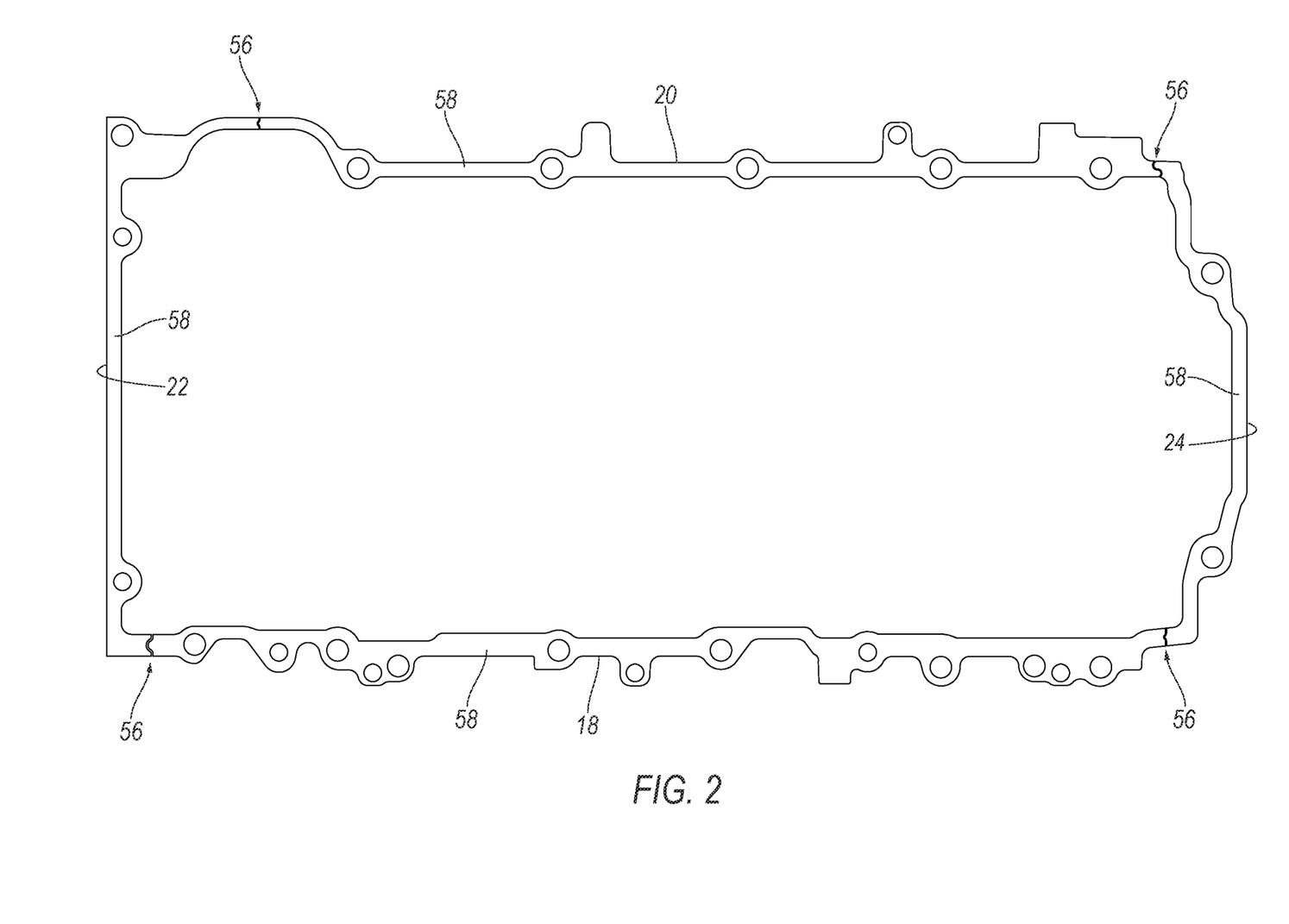
FIG. 2 is a plan view of a plurality of members of the gasket.
Figure 3:
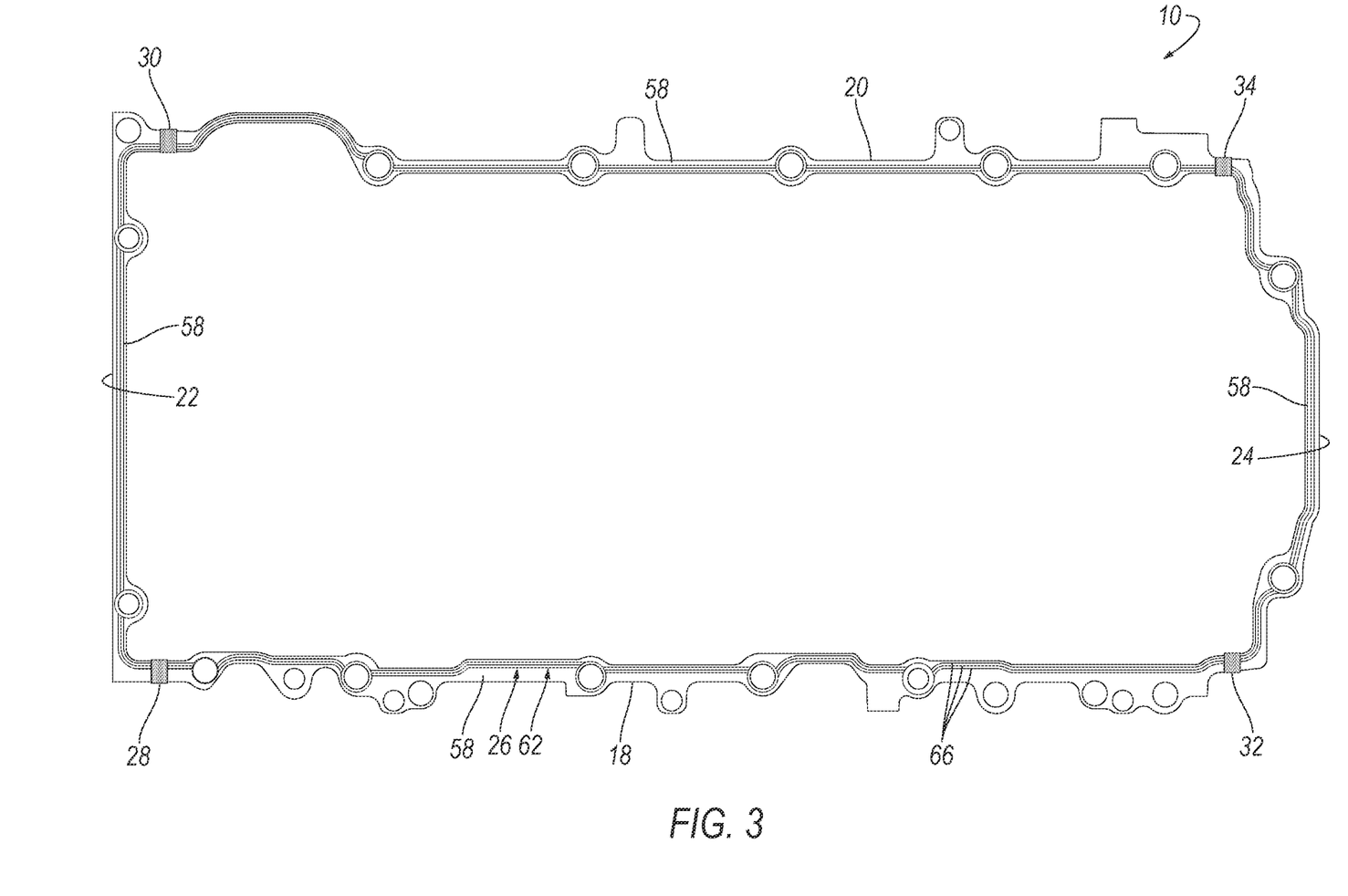
FIG. 3 is a plan view of the gasket, which includes the members and an elastomeric layer on the members.
Figure 4:
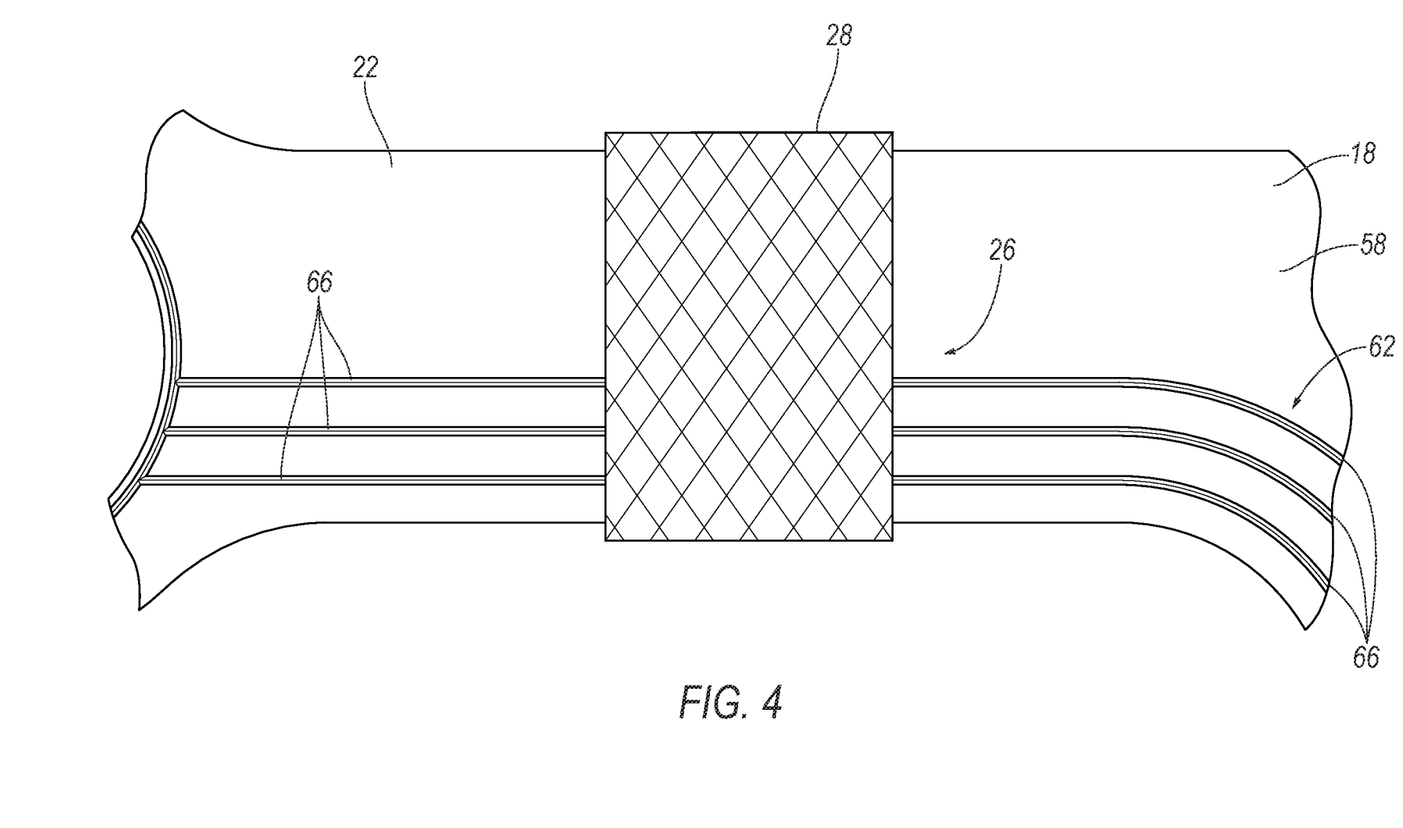
FIG. 4 is a magnified view of a portion of FIG. 3.

As set forth above, the gasket 10 includes at least three members and, in the example shown in the figures, includes four members 18, 20, 22, 24. In other examples, the gasket 10 may include more than four members 18, 20, 22, 24. The members 18, 20, 22, 24 are spaced from each other and are joined by the elastomeric layer 26, as described further below. FIG. 2 shows the positions of the members 18, 20, 22, 24 prior to application of the elastomeric layer 26. A space 56 is between each of the members 18, 20, 22, 24, as shown in FIG. 2, and the space 56 is filled by the elastomeric layer 26, as shown in FIGS. 5 and 8. Specifically, the respective one of the joints 28, 30, 32, 34 fills the space 56, as shown in FIG. 5.

The members 18, 20, 22, 24 are rigid relative to the elastomeric layer 26. In other words, the elastomeric layer 26, specifically the joints 28, 30, 32, 34, bend more easily than the members 18, 20, 22, 24. Accordingly, the members 18, 20, 22, 24 back the elastomeric layer 26. The members 18, 20, 22, 24 may be metal, e.g., steel. Each of the members 18, 20, 22, 24 may be of the same type of material. The members 18, 20, 22, 24 may be 0.15-0.25 mm thick, as an example. Each of the members 18, 20, 22, 24 may have the same thickness, as is shown in the example in the figures.

Each member is elongated along an axis. In other words, the longest dimension of the member is on the axis. Namely, the first member 18 is elongated along a first axis A1, the second member 20 is elongated along a second axis A2, the third member 22 is elongated along a third axis A3, and the fourth member 24 is elongated along a fourth axis A4. The first axis A1 and the second axis A2 are spaced from each other. The third axis A3 and the fourth axis A4 are spaced from each other and are transverse to the first axis A1 and the second axis A2. The third axis A3 and/or the fourth axis A4 may be perpendicular to the first axis A1 and/or the second axis A2. The first axis A1 and the second axis A2 may be parallel to each other and the third axis A3 and the fourth axis A4 may be parallel to each other, as shown in the example in the figures. The members 18, 20, 22, 24 each have ends (not numbered) on the respective axis A1, A2, A3, A4 and the ends are joined by the respective joints 28, 30, 32, 34.

The members 18, 20, 22, 24 may have various features and shapes along the axis A1, A2, A3, A4 without departing from being elongated along the respective axis A1, A2, A3, A4. For example, the members 18, 20, 22, 24 may include fastener holes (not numbered) that are positioned to be aligned with the fastener holes in cover 16 and engine block 14. Fasteners extend through the fastener holes in the cover 16, gasket 10, and engine block 14 to connect the cover 16 to the engine block 14. The elastomeric material may encircle one or more of the fastener holes. As another example, the member can include lips, hooked ends, etc., that do not depart from the member being elongated along the respective axis.

Each member is planar. Specifically, each member has a first planar face 58 and a second planar face 60 parallel to the first planar face 58. The planar faces 58, 60 are elongated and flat in the respective plane. The first planar faces 58 of each of the members 18, 20, 22, 24 face a common direction and the second planar faces 60 of each of the members 18, 20, 22, 24 face a common direction opposite that of the first planar faces 58. The first planar faces 58 of the members 18, 20, 22, 24 may be in different planes, i.e., when the members 18, 20, 22, 24 are in different planes as describe above. Similarly, the second planar faces 60 of the members 18, 20, 22, 24 may be in different planes, i.e., when the members 18, 20, 22, 24 are in different planes as described above. The elastomeric layer 26 is on both planar faces 58, 60 of each member.

The members 18, 20, 22, 24 are designed to be on the sealing surfaces 36, 38 of the engine block 14 and the cover 16, i.e., are at least sized and shaped to be on the sealing surfaces 36, 38. In other words, the members 18, 20, 22, 24 are sized and shaped to mate with the sealing surfaces 36, 38 of the engine block 14 and the cover 16. The members 18, 20, 22, 24 are positioned to be on different segments 40, 42, 44, 46 of the sealing surface 36 of the engine block 14. Specifically, the member may be seated on the respective segment of the sealing surface and the joints 28, 30, 32, 34 bridge any gap 48 that may exist between segments 40, 42, 44, 46 of the sealing surface 36 that are in different planes. Specifically, in the example shown in the figure, the third member 22 is seated on the first segment 40 of the sealing surface 36, the second member 20 is seated on the second segment 42 of the sealing surface 36, the third member 22 is seated on the third segment 44 of the sealing surface 36, and the fourth member 24 is seated on the fourth segment 46 of the sealing surface 36.

The elastomeric layer 26 is an elastomeric material. The elastomeric material may be any suitable type of silicone (e.g., silicone rubber), rubber, etc. The elastomeric material is flexible such that the elastomeric layer 26, specifically each joint 28, 30, 32, 34, is flexible relative to the members 18, 20, 22, 24.

The elastomeric layer 26 joins the members 18, 20, 22, 24 together. Specifically, the elastomeric layer 26 is elongated along the members 18, 20, 22, 24 and join adjacent members 18, 20, 22, 24 with the joints 28, 30, 32, 34. The elastomeric layer 26 is an endless ring, i.e., extending along the first member 18, the second member 20, the third member 22, and the fourth member 24 and joining the four members 18, 20, 22, 24 with the four joints 28, 30, 32, 34 in the example shown in the figures. The elastomeric layer 26 is fixed to the members 18, 20, 22, 24, e.g. bonded to the members 18, 20, 22, 24.

The elastomeric layer 26 may include two layers with the member therebetween. In other words, the elastomeric layer 26 may be on both the first planar face 58 and the second planar face 60 of each of the members 18, 20, 22, 24. Specifically, with reference to FIG. 5, the elastomeric layer 26 can include a first layer 62 on the first planar faces 58 of the members 18, 20, 22, 24 and a second layer 64 on the second planar faces 60 of the members 18, 20, 22, 24. The first layer 62 and the second layer 64 on each member 18, 20, 22, 24 extends continuously from the joint on one end of the member to the joint on the other end of the member. As set forth above, the elastomeric layer 26 is fixed to the members 18, 20, 22, 24. Specifically, the elastomeric layer 26 is fixed, e.g., bonded with the first planar face 58 and the second planar face 60 of each member 18, 20, 22, 24. The first layer 62, the second layer 64, and the joints 28, 30, 32, 34 may be of the same type of material.

The elastomeric layer 26 includes sealing beads 66. Specifically, the first layer 62 and/or the second layer 64 may include one or more sealing beads 66. The sealing beads 66 of the first layer 62 are on the first planar surface of the respective member and the sealing beads 66 of the second layer 64 are on the second planar surface of the respective member. Each sealing bead 66 extends continuously from one of the joints 28, 30, 32, 34 to another of the joints 28, 30, 32, 34. In the example in the figures, the elastomeric layer 26 includes three sealing beads 66 on the first planar face 58 and three sealing beads 66 on the second planar face 60 of each of the members 18, 20, 22, 24. The sealing beads 66 may be bead-shaped, as shown in the example in the figures.

The sealing beads 66 protrude from the respective member that the sealing bead 66 is on. Specifically, the sealing beads 66 protrude in an away-facing direction from the planar face of the respective member. The sealing beads 66 on the first planar surfaces of the members 18, 20, 22, 24 extend in a common direction from the first planar surfaces. Likewise, the sealing beads 66 on the second planar surfaces of the members 18, 20, 22, 24 extend in a common direction from the second planar surfaces. The sealing beads 66, for example, may be 40-60 thousandths of an inch thick in the away-facing direction.

The elastomeric layer 26 is unitary, i.e., a single, uniform piece of material with no seams, fasteners, or adhesives holding it together. Specifically, the joints 28, 30, 32, 34, first layer 62, and second layer 64 of the unitary elastomeric layer 26 are formed together simultaneously as a single continuous unit, e.g., overmolding, molding, etc. Non-unitary components, in contrast, are formed separately and subsequently assembled, e.g., by adhesive, bonding, etc.

The elastomeric layer 26 may be overmolded on the members 18, 20, 22, 24. "Over-molded" is a structural description of the elastomeric layer 26, not the process by which the elastomeric layer 26 is made. In other words, the over-molded elastomeric layer 26 has the structure of an over-molded component. When over-molded, the elastomeric layer 26 may be a single, uniform piece of material with no seams, joints 28, 30, 32, 34, and may be fixed to the members 18, 20, 22, 24 without fasteners or adhesives holding the elastomeric layer 26 and the members 18, 20, 22, 24 together. In such an example, the elastomeric layer 26 has a shape that conforms to a mold, e.g., an injection mold, used to form the elastomeric layer 26 as an over-molded component to the members 18, 20, 22, 24.

As set forth above, the elastomeric layer 26 includes at least two joints, namely the first joint 28 between the first member 18 and third member 22 and the second joint 30 between the second member 20 and the third member 22. In the example shown in the figures, the elastomeric layer 26 includes a third joint 32 between the first member 18 and the fourth member 24 and a fourth joint 34 between the second member 20 and the fourth member 24. The joints 28, 30, 32, 34 are flexible relative to the members 18, 20, 22, 24. Specifically, when the gasket 10 is installed to the sealing surface, the joints 28, 30, 32, 34 may bend relative to the members 18, 20, 22, 24, without bending the members 18, 20, 22, 24, to match any potential changes in plane of the sealing surface.

When the gasket 10 is assembled to the engine block 14 and the cover 16, the joints 28, 30, 32, 34 are between the sealing surfaces 36, 38 of the engine block 14 and the cover 16 and overlap interfaces between the base 50 and the cover plates 52, 54. Specifically, the first joint 28 abuts the first segment 40 of the sealing surface 36 on first cover plate 52 and the second segment 42 of the sealing surface 36 on the base 50 and overlaps an interface between the first cover plate 52 and the base 50. The second joint 30 abuts the first segment 40 of the sealing surface 36 on the first cover plate 52 and the third segment 44 of the sealing surface 36 on the base 50 and overlaps an interface between the first cover plate 52 and the base 50. The third joint 32 abuts the fourth segment 46 of the sealing surface 36 on the second cover plate 54 and the second segment 42 of the sealing surface 36 on the base 50 and overlaps an interface between the second cover plate 54 and the base 50. The fourth joint 34 abuts the fourth segment 46 of the sealing surface 36 on the second cover plate 54 and the third segment 44 of the sealing surface 36 on the base 50 and overlaps an interface between the second cover plate 54 and the base 50.

The first joint 28 and the second joint 30 allow the gasket 10 to flex to accommodate potential variation in the sealing surface 36 of the engine block 14, as described above, without bending of the first member 18, the second member 20, or the third member 22. In other words, the first joint 28 and the second joint 30 bend to match the sealing surface and the first member 18, the second member 20, and the third member 22 remain planar. In examples including the third joint 32 and the fourth joint 34, the third joint 32 and the fourth joint 34 allow the gasket 10 to flex to accommodate potential variation in the sealing surface 36 of the engine block 14, as described above, without bending of the second member 20, third member 22, or fourth member 24. In other words, the third joint 32 and the fourth joint 34 bend to match the sealing surface and the first member 18, the second member 20, the fourth member 24 remain planar. In such an example, the third member 22 and the fourth member 24 may both be in different planes than the first member 18 and the second member 20 so that the gasket 10 can seal against a scaling surface 36 that has multiple plane changes.

The gasket 10 may be thicker at the joints 28, 30, 32, 34 than at the first layer 62 and second layer 64 prior to installation to the engine block 14 and the cover 16. Specially, the gasket 10 has a thickness TJ at the joints 28, 30, 32, 34 and a thickness TL at the first layer 62 and the second layer 64. The first layer 62 protrudes from the members 18, 20, 22, 24 in a first away-facing direction D1 and the second layer 64 protrudes from the members 18, 20, 22, 24 in a second away-facing direction D2 (FIG. 5). The joints 28, 30, 32, 34 protrude from the first layer 62 in the first away-facing direction D1 and protrude from the second layer 64 in the second away-facing direction D2. As an example, the thickness TJ may be 0.7-0.9 mm and the thickness TL may be 0.4-0.6 mm.

The joints 28, 30, 32, 34 compress to the same thickness as the rest of the gasket 10 when assembled in compression between the engine block 14 and the cover 16, as shown in FIG. 8. The joints 28, 30, 32, 34 may be more compressible than the first layer 62 and the second layer 64. The joints 28, 30, 32, 34 may include surface features that allow the joints 28, 30, 32, 34 to compress more easily than the first layer 62 and the second layer 64. For example, with reference to FIG. 4, the joints 28, 30, 32, 34 may have a honeycomb surface feature, a hatched surface feature, etc., that includes voids on the surface that increase the compressibility of the joints 28, 30, 32, 34.

When assembled to the engine block 14 and the cover 16, the joints 28, 30, 32, 34 flex in the event there are changes in plane of the sealing surface 36, as described above. In addition, since the gasket 10 is thicker at the joints 28, 30, 32, 34, the joints 28, 30, 32, 34 conform to the shape of gaps 48 in the sealing surface 36 resulting from changes in plane of the sealing surface 36, as shown in FIG. 8. In the example in which the joints 28, 30, 32, 34 are more compressible than the first layer 62 and the second layer 64, the compressibility of the joints 28, 30, 32, 34 aids in the ability of the joint to conform to the shape of gaps 48 in the sealing surface 36 to seal between the sealing surface 36 of the engine block 14 and the sealing surface 38 of the cover 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A gasket comprising:
a first member elongated along a first axis;
a second member elongated along a second axis and spaced from the first member along a third axis that is transverse to the first axis and the second axis;
a third member elongated along the third axis, the third member being spaced from the first member and the second member;
the first member, the second member, and the third member being metal;
the first member, the second member, and the third member being planar and each having a planar face, the planar faces of the first member, the second member, and the third member facing a common direction;
a layer of elastomeric material on the planar face of each of the first member, the second member, the third member;
the layer of elastomeric material including a first joint extending from the first member to the third member and the layer of elastomeric material including a second joint extending from the second member to the third member, the first joint and the second joint each being flexible relative to the first member, the second member, and the third member; and
the layer of elastomeric material being unitary;
the layer of elastomeric material includes a first sealing bead protruding in an away-facing direction from the planar face of the first member, a second sealing bead protruding in the away-facing direction from the planar face of the second member, and a third sealing bead protruding in the away-facing direction from the planar face of the third member; and
the first joint protrudes from the first sealing bead and the third sealing bead in the away-facing direction.

2. The gasket as set forth in claim 1, wherein the layer of elastomeric material is overmolded on the first member, the second member, and the third member.

3. The gasket as set forth in claim 1, wherein the planar face of the first member and the second member each have a distal end distal to the third member, the layer of elastomeric material extending continuously across the first member from the distal end of the first member to the first joint, continuously across the third member from the first joint to the second joint, and continuously across the second member from the second joint to the distal end of the second member.

4. The gasket as set forth in claim 1, wherein the first axis and the second axis are parallel to each other.

5. The gasket as set forth in claim 1, wherein the third axis is perpendicular to the first axis and the second axis.

6. The gasket as set forth in claim 1, wherein
the second joint protrudes from the second sealing bead and the third sealing bead in the away-facing direction.

7. The gasket as set forth in claim 1, further comprising:
a fourth member elongated along a fourth axis and spaced from the first member and the second member;
the fourth member having a planar face facing the common direction;
the layer of elastomeric material extending across the planar face of the fourth member; and
the layer of elastomeric material including a third joint extending from the first member to the fourth member and a fourth joint extending from the second member to the fourth member, the third joint and the fourth joint each being flexible relative to the first member, the second member, and the fourth member.

8. The gasket as set forth in claim 7, wherein:
the layer of elastomeric material includes a fourth sealing bead protruding in the away-facing direction from the planar face of the fourth member;
the second joint protrudes from the second sealing bead and the third sealing bead in the away-facing direction;
the third joint protrudes from the first sealing bead and the fourth sealing bead in the away-facing direction; and
the fourth joint protrudes from the second sealing bead and the fourth sealing bead in the away-facing direction.

9. The gasket as set forth in claim 7, wherein the layer of elastomeric material is an endless ring extending along the first member, the second member, the third member, and the fourth member.

10. A gasket comprising:
a first member elongated along a first axis;

a second member elongated along a second axis and spaced from the first member along a third axis that is transverse to the first axis and the second axis;

a third member elongated along the third axis, the third member being spaced from the first member and the second member and defining a space between the first member and the third member;

the first member, the second member, and the third member being metal;

a layer of elastomeric material on the first member, the second member, the third member;

the layer of elastomeric material including a first joint extending from the first member to the third member and the layer of elastomeric material including a second joint extending from the second member to the third member, the first joint and the second joint each being flexible relative to the first member, the second member, and the third member;

the layer of elastomeric material being unitary;

the layer of elastomeric material including a first sealing bead protruding in an away-facing direction from the first member, a second sealing bead protruding in the away-facing direction from the second member, and a third sealing bead protruding in the away-facing direction from the planar face of the third member; and the first joint protruding from the first sealing bead and the third sealing bead in the away-facing direction.

11. The gasket as set forth in claim 10, wherein the layer of elastomeric material is overmolded on the first member, the second member, and the third member.

12. The gasket as set forth in claim 10, further comprising:
a fourth member elongated along a fourth axis spaced from the third axis and transvers to the second axis and the third axis;
the layer of elastomeric material extending across the fourth member; and
the layer of elastomeric material including a third joint extending from the first member to the fourth member and a fourth joint extending from the second member to the fourth member, the third joint and the fourth joint each being flexible relative to the first member, the second member, and the fourth member.

13. The gasket as set forth in claim 1, wherein:
a space extends along the first axis from the first member to the third member between the first member and the third member;
a space extends along the second axis from the second member to the third member between the first member and the second member; and
the first joint extends from the first member to the third member in the space between the first member and the third member, and the second joint extends from the second member to the third member in the space between the second member and the third member.

14. The gasket as set forth in claim 13, wherein the first joint extends a first distance in a first direction from the space along the first member, and the first joint extends in a second distance in a second direction from the space along the third member, the second distance being longer than the first distance.

15. The gasket as set forth in claim 1, wherein the layer of elastomeric material includes a first layer that includes the first sealing bead, the first joint being more compressible than the first layer.

16. An internal-combustion engine comprising:
an engine block having a sealing surface, the sealing surface of the engine block having a first segment and a second segment in a different plane than the first segment;
a cover having a sealing surface that is planar; and
a gasket between the sealing surface of the engine block and the sealing surface of the cover;
the gasket including a first member elongated along a first axis, a second member elongated along a second axis spaced from the first axis, and a third member elongated along a third axis;
the first member, the second member, and the third member being metal;
the gasket including a layer of elastomeric material abutting the sealing surface of the engine block;
the first member being on the first segment of the sealing surface of the engine block and the third member being on the second segment;
the first member and the second member being elongated in a first plane and the third member being elongated on a second plane spaced from the first plane;
the layer of elastomeric material including a first joint extending from the first member to the third member and the layer of elastomeric material including a second joint extending from the second member to the third member; and
the layer of elastomeric material being unitary.

17. The internal-combustion engine as set forth in claim 16, wherein
the first plane is parallel to the second plane.

18. The internal-combustion engine as set forth in claim 16, wherein the layer of elastomeric material is elongated along the first member, the second member, and the third member.

19. The internal-combustion engine as set forth in claim 16, wherein:
the gasket includes a fourth member elongated along a fourth axis and spaced from the first member and the second member; and
the layer of elastomeric material includes a third joint extending from the first member to the fourth member and a fourth joint extending from the second member to the fourth member.

20. The internal-combustion engine as set forth in claim 16, wherein the layer of elastomeric material is an endless ring extending along the first member, the second member, the third member, and the fourth member.

* * * * *